United States Patent
Fu et al.

(10) Patent No.: US 6,703,072 B2
(45) Date of Patent: Mar. 9, 2004

(54) METHOD UTILIZING AN AERODYNAMIC INTERLACING PROCESS TO PRODUCE A CHEMICAL FILTER MEDIA

(76) Inventors: Steven Hau-Cheng Fu, No. 149, Hai Shan Road, Sec. 2, Luchu Hsiang, Taoyuan Hsien (TW); Chin-Cheng Chuang, No. 149, Hai Shan Road, Sec. 2, Luchu Hsiang, Taoyuan Hsien (TW)

(*) Notice: Subject to any disclaimer, the term of this patent is extended or adjusted under 35 U.S.C. 154(b) by 39 days.

(21) Appl. No.: 10/106,500

(22) Filed: Mar. 27, 2002

(65) Prior Publication Data

US 2003/0183083 A1 Oct. 2, 2003

(51) Int. Cl.[7] ............................. B05D 1/36; B05D 5/00
(52) U.S. Cl. ....................... 427/201; 427/206; 427/294; 427/244; 96/135; 55/486; 55/524; 55/DIG. 5
(58) Field of Search ......................... 96/135, 153, 154; 55/486, 524, 527, DIG. 5; 442/417; 427/201, 202, 203, 206, 244, 245, 294, 374.1; 264/DIG. 48

(56) References Cited

U.S. PATENT DOCUMENTS

| | | | | |
|---|---|---|---|---|
| 3,971,373 A | * | 7/1976 | Braun ................... 128/206.19 |
| 4,429,001 A | * | 1/1984 | Kolpin et al. ............... 442/340 |
| 4,433,024 A | * | 2/1984 | Eian .......................... 428/198 |
| 4,755,178 A | * | 7/1988 | Insley et al. ................ 604/367 |
| 5,221,573 A | * | 6/1993 | Baigas, Jr. .................. 428/212 |
| 5,486,410 A | * | 1/1996 | Groeger et al. ............. 442/353 |
| 5,569,489 A | * | 10/1996 | Kasmark, Jr. ............... 427/202 |
| 5,871,569 A | * | 2/1999 | Oehler et al. ................. 96/153 |
| 6,132,803 A | * | 10/2000 | Kelly et al. ................. 427/244 |
| 2003/0114066 A1 | * | 6/2003 | Clark et al. ................. 442/361 |

\* cited by examiner

*Primary Examiner*—Frank M. Lawrence
(74) *Attorney, Agent, or Firm*—Rosenberg, Klein & Lee (57) ABSTRACT

The present invention relates to a method of utilizing the aerodynamic interlacing process to produce a chemical filter media, comprising: (a) utilizing the airflow to bring short-cut fibers and functional particulates to a composite air blower, thereby enabling the blowing air of the short-cut fibers and the functional particulates to enter into diffusing mixing conveying area at the same time so that the mixed airflow diffuses the short-cut fibers and the functional particulates from the top to the bottom which flow afterwards to a multilayer interlacing forming area beneath; (b) utilizing an air suction device under the multilayer interlacing forming area to adsorb the short-cut fibers and the functional particulates for sequentially piling up on a moving forming matrix so that the filter media is formed with a laminated structure having several layers of from sparse to dense, (c) heating the filter media and (d) cooling the filter media.

4 Claims, 5 Drawing Sheets

METHOD UTILIZING AN AERODYNAMIC INTERLACING PROCESS TO PRODUCE A CHEMICAL FILTER MEDIA

BACKGROUND OF THE INVENTION

1. Field of the Invention

The present invention relates to a method utilizing an aerodynamic interlacing process to produce a chemical filter media, more particularly to an improved method through which bi-component fibers and functional particulates are incorporated into a composite structure of a chemical filter media.

2. Description of the Prior Art

Functional particulate, such as activated carbon, magnesium bicarbonate, zeolite . . . etc, has long been used in the elimination of chemical contaminants. In applications that require low level of chemical contamination to be eliminated ($\leqq 50$ ppm), these functional particulates are generally loaded onto a fibrous web to meet converting requirements such as pleating or molding.

With respect to the forming of particulate loaded web, several existing inventions have focused on the benefit resulting from the absence of resin adhesives. This is because resin adhesive undesirably block large portions of particulate's open surface area therefore drastically reduces the media's ability to adsorb.

This is especially important in low level contamination applications because at low concentration level, contaminants can not penetrate deeply into body of particulate, only outer layer of particulate surface can be effectively utilized for adsorption. Primary filtration mechanism for low pollutant concentration level is diffusion. That is, pollutant is diffused from airstreams into surface of sorbent particulate, hence held within sorbent particulate by Van der Waals force. When pressure gradient is low, diffused pollutant can not penetrate deeply into body of particulate. Therefore maximizing particulate's outer surface exposure to contamination is essential in prolonging filter service life, which terminates when pollutant penetration reaches a predetermined level.

Many inventions and disclosures are available in the application scopes of resin adhesive free chemical filter media. In U.S. Pat. Nos. 3,971,373 to Braun, a process of immobilizing particulate matter in a melt blown web is described. Although results from a melt blown process has the advantage of very fine pores which provides the filter media an additional mechanical efficiency for particulate filtration. However, its micro fibers and small pore sizes also have the disadvantage of high resistance and low tensile strength characteristics. The high resistance characteristic excludes this type of filter media from applications where higher particulate density is required. The lack of tensile strength also limits this type of filter media to few converting processes.

U.S. Pat. Nos. 5,486,410 to Groeger el, describes a process of loading particulate matters into a preformed fiber matrix. Although this process allows for wider particulate density range, however, in order to achieve higher particulate density using this method, multiple layers must be bonded together. Because this process require particulate matters to deposit into preformed cells in the web, evenness of particulate distribution on the web is constrained by the evenness of pre-constructed cell formation and arrangement. Size of opening space (air channel) formed by adjacent particulate is predetermined by size of preformed cells in the web. In addition, because particulates are likely to be trapped by intersections of bonded fibers, spaces between adjacent particulates, or air channels, are left largely open.

This invention addresses an important issue essential to maximizing particulate's surface exposure, that is to create a superior microstructure within a particulate loaded web. As particulates load up in a web, spaces, or air channels are formed between adjacent particulates. Larger the air channels, faster and more directly the air can move through the filter media, thus shorter the air residence time in the filter media. The result from this disadvantaged scenario is two fold. First, the direct airflow will exhaust only particulate surface area facing air channels, therefore service life of filter media will terminate when there is still sizable portion of unused particulate surface area. Second, because pollutant is allowed to pass through filter media with higher momentum, the effectiveness of diffusion mechanism reduced.

On the other hand, if sizes of air channels and speed of airflow is reduced, path of airflow is more tortuous, and air residence time is increased, pollutant will be exposed to more particulate surface area before it exits the filter media. In another word, the utilization of filter media's total particulate surface area is substantially increased, and the chance for sorbent particulates to grab diffused pollutant in the airflow is largely improved.

The process of invention will produce a chemical filter media in form of a sorbent particulate loaded fiber web, which will cause air channels formed by adjacent particulates filled by multiple number of fibers to create a diverting mechanism. This diverting mechanism, will significantly reduce the size of air channels, and will cause pollutant in airflow to travel in a tortuous path therefore result in significantly longer residence time, and will result in higher exposure to surface of sorbent particulates thus result in greater probability to diffuse into sorbet's surface area. Ultimately, chemical filter media produced using process of invention will result in significantly longer service life than those of equivalent density but produced using different process.

SUMMARY OF THE INVENTION

It is the primary objective of the present invention to provide a method and structure for producing chemical filter media. This objective is achieve primarily by an aerodynamic interlacing process and secondly by an innovative thermo process. Short-cut bi-component fibers and functional particulate (e.g. activated carbon, potassium permanganate impregnated aluminum oxide and chemical adsorptive macromolecule) are the basic materials. A consistent flow of air is responsible for engaging fibers and particulate in mixing, interlacing and forming processes to create a sheet of nonwoven chemical filter media.

Another objective of the present invention is based on the aerodynamic interlacing process to create a chemical filter media which does not require the use of a preformed fiber web as substrate. The advantage is, because short cut fibers are used to evenly mix with particulate during the aerodynamic forming process, the evenness and coherence of fiber/particulate integration, the evenness of pore distribution, the structure consistency, are all unsurpassed by other methods that require a preformed fiber web to load up particulates. In addition, the aerodynamic interlacing process allows for fiber/particulate mixing ratio to be controllable over a wide range. The choice of particulate mesh size and fiber denier size can be varied according to the requirement of final media characteristics. Moreover, high particulate density can be achieved in single pass, without the need to laminate several layers of lower density media to achieve high density objective. Therefore, structure consistency and coherence is high.

A further objective of the present invention is based on the aerodynamic process to achieve a controllable gradient structure. By adjusting airflow behaviors in the forming chute, resulting fiber/particulate distribution through the thickness of media may vary. Fiber/particulate may either be evenly distributed throughout the thickness of media, or it may be fiber heavy on one side and particulate heavy on the other. This controllable gradient structure allows one to control filter media permeability an adsorptive rate therefore present to filter designer a flexibility that is previously unavailable.

Still another objective of the present invention is based on the aerodynamic process to produce to a chemical filter media with minimum channeling effect. A channeling effect is said to be taking place when contaminant is able to find its way from upstream to downstream through largest spaces between adjacent particulates (air channel), without being adsorbed by particulate. To minimize channeling effect, air channels must be consistently small and tortuous, and must allow airflow pass through at closest possible distance from particulates with longest possible residence time.

Because the aerodynamic interlacing technology integrates particulate and short cut fibers simultaneously, instead of depositing particulate into a preformed substrate, openings formed between adjacent particulates are consistently small. More over, openings between adjacent particulates are advantageously filled with a controlled amount of fibers (a fiber aggregate) to divert airflow passing through the media.

This improved micro-structure is further enhanced by a thermo contraction process immediately follows. When heated, sheath material of bi-component fibers is melted to bond to one another. This bonding immobilizes functional particulate and provides tensile strength to resulting filter media. This thermo process also facilitates a controlled contraction to further reduce size of air channels. Furthermore, as the media is quenched, a slight gap will form between fiber aggregate and particulates, this is because materials are likely to have stronger bonding to more compatible materials (fibers to fibers), hence pulled away from lesser compatible materials (fibers to particulate). As a result, fiber aggregates become an effective diverting mechanism that forces airflow to pass through air channels at a very close distance from particulate surface.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
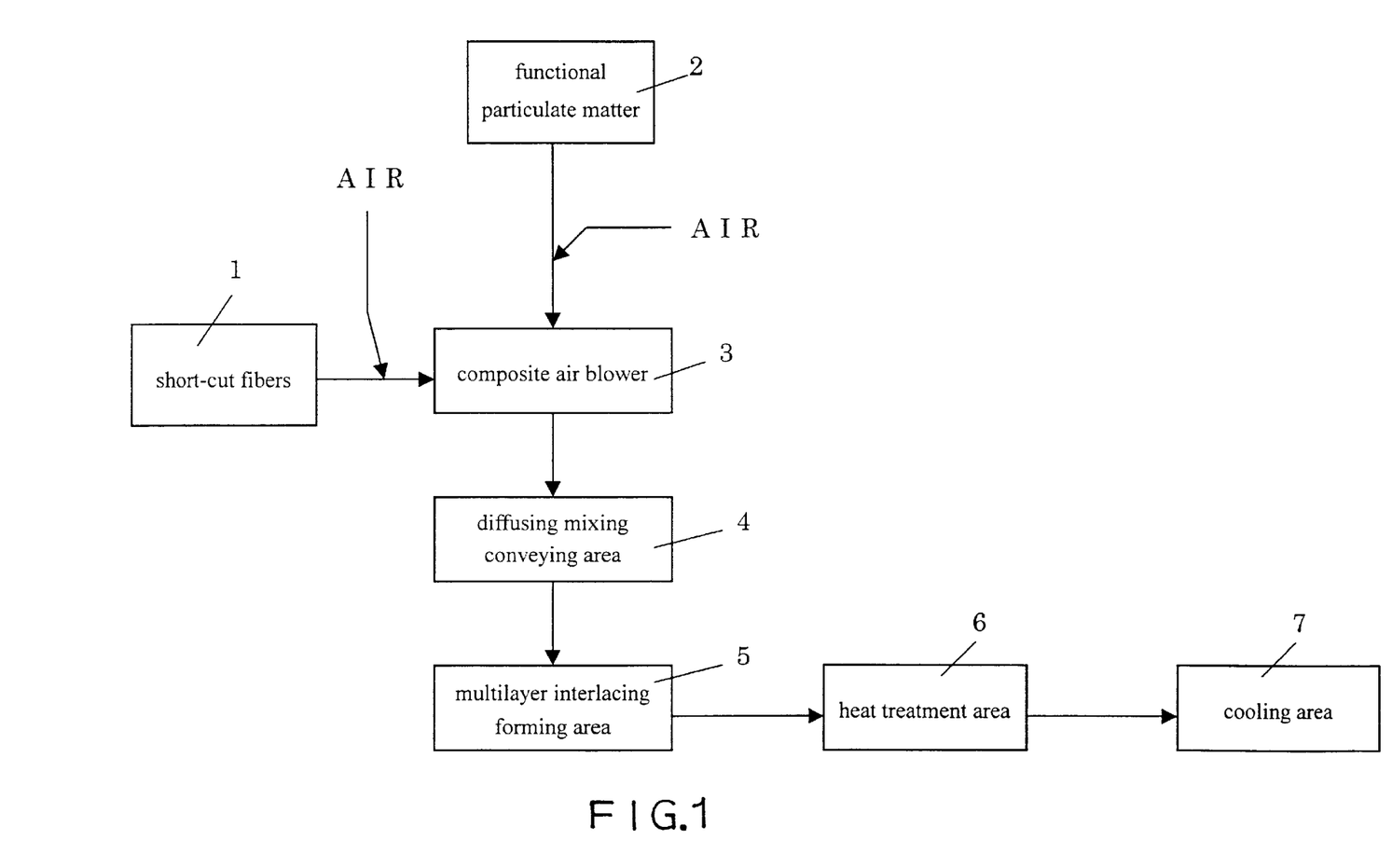
FIG. 1 is a block diagram of the steps of the present invention.
Figure 2:
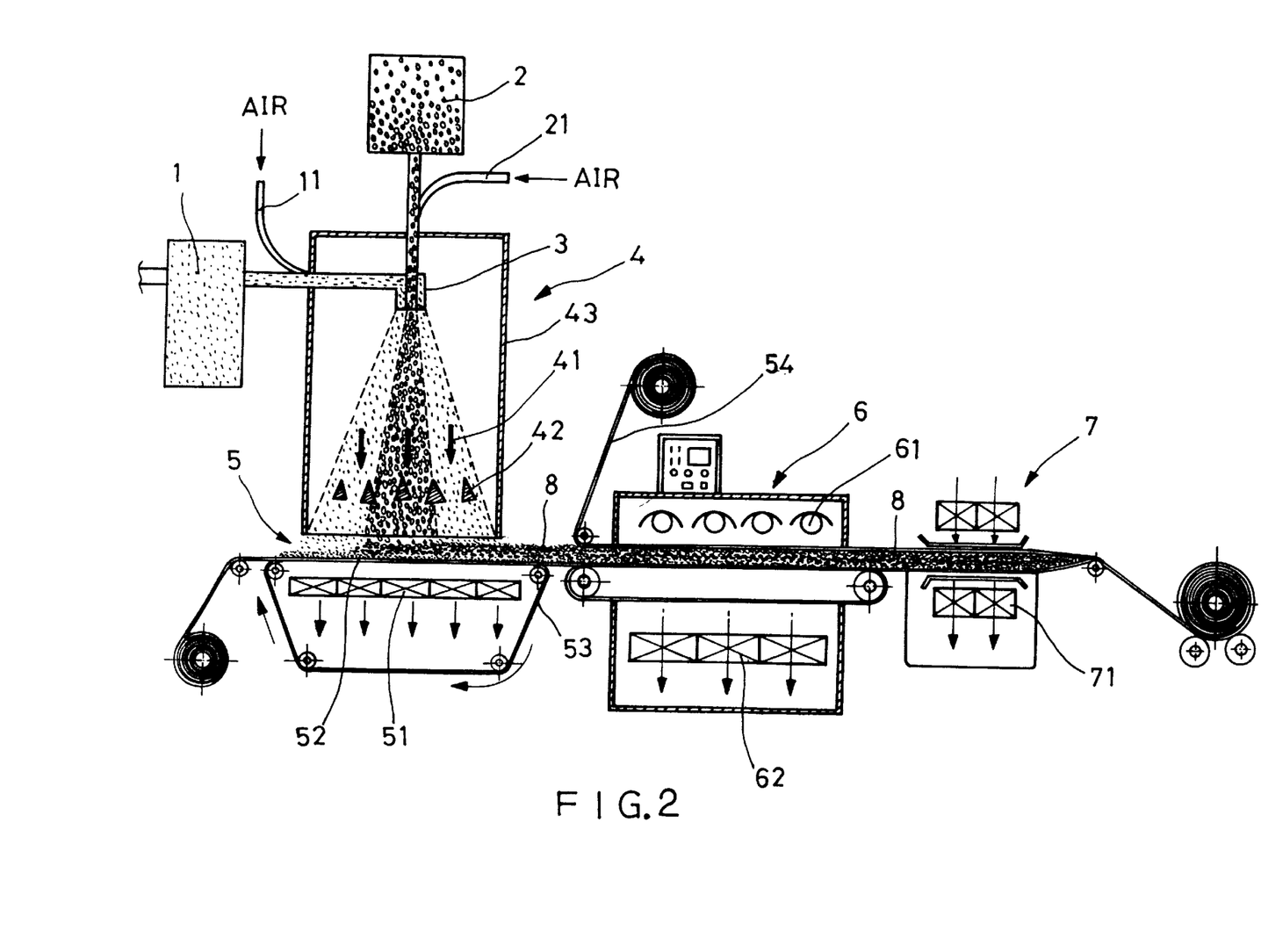
FIG. 2 is a schematic drawing of the procedure of the present invention.

First of all, referring to FIGS. 1 and 2, the method and structure of utilizing the aerodynamic interlacing process to produce a chemical filter media includes the steps of:

(a) utilizing the airflow to bring short-cut fibers 1 and functional particulates 2 to a composite air blower 3 while the blowing airflow of the functional particulates 2 enters into the composite air blower 3 from the center thereof, and the composite air blower is constructed as a conventional blowing apparatus and which is not restricted to the round figure, but preferably rectangular to form a narrow and slim blowing mouth, thereby enabling the blowing air of the short-cut fibers 1 and the functional particulates 2 to enter into diffusing mixing conveying area 4 at the same time so that the mixed airflow 41 diffuses the short-cut fibers 1 and the functional particulates 2 from the top to the bottom which flow afterwards through an air guide device 42 so that the airflow is able to smoothly bring them to a multi-layer interlacing forming area 5 beneath, (b) utilizing an air suction device 51 under the multilayer interlacing forming area 5 to adsorb the short-cut fibers 1 and the functional particulates 2 for sequentially piling up on a moving forming matrix 52 while the suction air volume of the air suction device 51 can be adjusted as desired in order to create a balance between the suction air and the mixed blowing air so that the filter media 8 is formed with a laminated structure having three layers of from sparse to dense, (c) bringing the pre-formed filter media 8 to heat treatment area 6 over which a heat source 61 is provided for heating the filter media 8 while the heating temperature is controlled in the range of from 120° C. to 180° C., wherein another air suction device 62 under the filter media 8 continues to operate, and (d) bringing the heat-treated filter media 8 to a cooling area 7, wherein a further air suction device 71 under said filter media 8 continues to operate.

In addition, the aforementioned functional particulate matter 2 can be activated carbon, potassium permanganate impregnation aluminum oxide and chemical adsorptive macromolecule.

Furthermore, the aforementioned diffusing mixing conveying area 4 is constructed as a mixing box with the opening downwards while the air guide device 42 consists of a number of air guide plates.

Based upon the above-mentioned, the blowing airflow 11 of the short-cut fibers 1 passes through the composite air blower 3 where the short-cut fibers 1 are in first contact with the functional particulates 2. A certain amount of the functional particulates 2 is brought into the system, and enters into the composite air blower 3 by means of the blowing airflow 21 so that the mixed airflow 41 of both matters enters into the diffusing mixing conveying area 4 at the same time. The fluid area is increased when the airflow exits the air blower 3 so that this place forms a turbulence which allows the short-cut fibers 1 and the functional particulates 2 to diffuse and mix with each other. Thereafter, the mixed airflow 41 reaches the multilayer interlacing forming area 5 through the special air guide device 42 at the lower part of the diffusing mixing conveying area 4.

Figure 3:
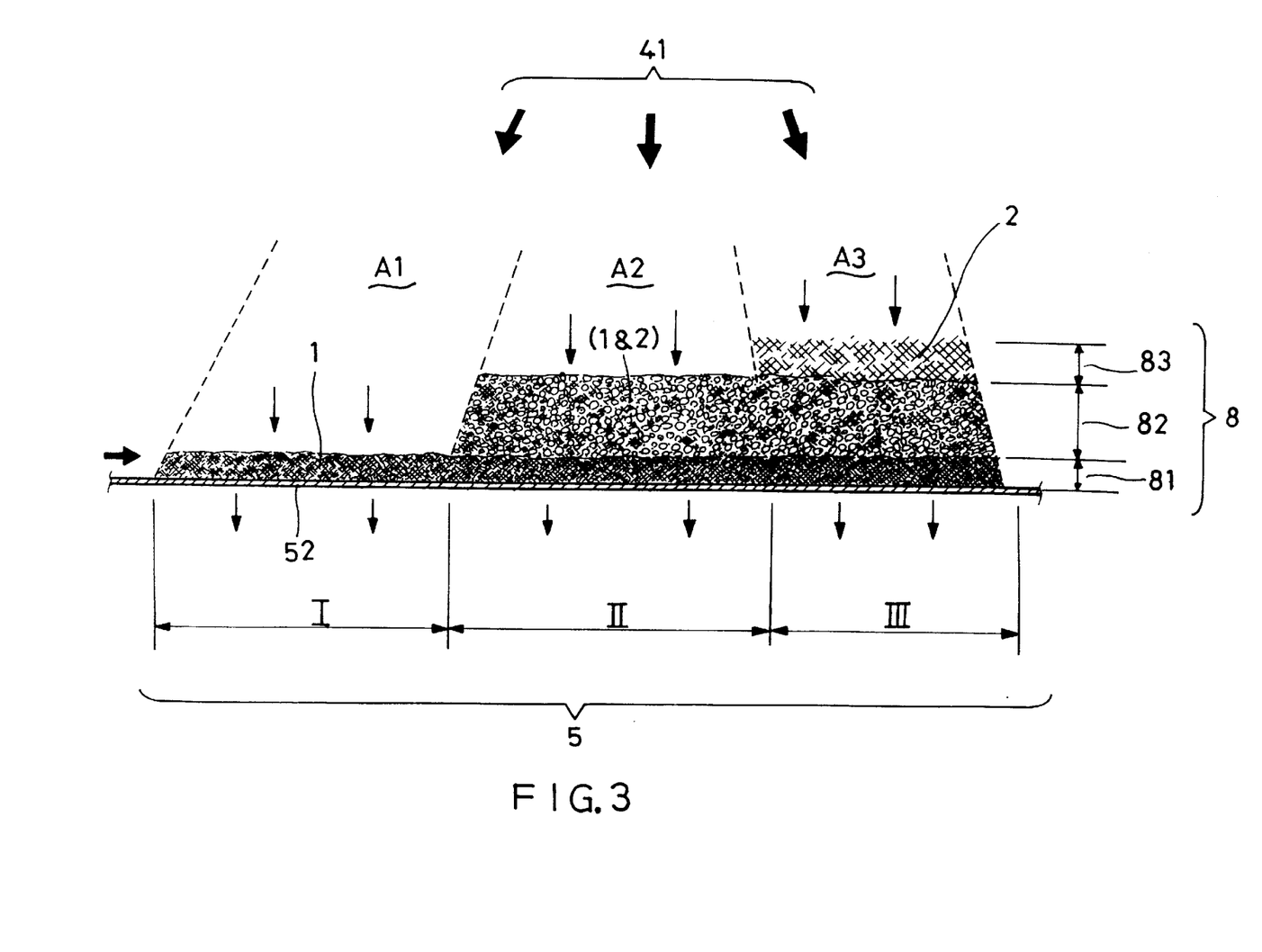
FIG. 3 is a schematic drawing of the filter media of the present invention, showing the aerodynamic interlacing process.

By means of the composite air blower 3, the diffusing mixing conveying area 4 can be divided into three airflow sections. As illustrated in FIG. 3, the left and right section A1, A3 are the fiber areas while the middle section A2 is the mixing section of the fibers and the activated carbon. This will lead to an apparent laminated structure after the three sections are formed. The exit of the composite air blower 3 is adjustable so that the area ratio among the three sections is controllable for changing the structure of the filter media to meet different requirements.

When the mixing airflow passes through the air guide device 42, it's ready to perform the forming procedure. During the forming procedure, the short-cut fibers 1 and the functional particulates 2 are piled up on the moving forming matrix 52 by means of the air suction device 51 while the moving forming matrix 52 is moved forward by a conveyer 53. The suction air volume of the air suction device 51 can be adjusted as desired in order to create a balance with the mixed blowing air 41 without leading to an airflow speed difference. If the suction air volume is insufficient, the mixed airflow 41 will blow the short-cut fibers 1 and the functional particulates 2 apart so that the forming procedure fails. If the suction air volume is too much, the conveying speed of the diffusing mixing conveying area 4 will be affected, thereby leading to the structural unevenness of the filter media because the both matters are formed before they are evenly mixed and interlaced. Therefore, it's necessary to adjust the air suction device 51 during the forming procedure. In addition, three airflow sections A1, A2, A3 are formed during the diffusing and mixing procedure; therefore, three forming stages are created when the short-cut fibers 1 and the functional particulates 2 are formed on the moving forming matrix 52 (see FIG. 3). In the first (I) stage, the fibers are deposited on the bottom layer. Since the moving forming matrix 52 continuously moves, then it comes into the second (II) stage in which the short-cut fibers 1 and the functional particulates 2 are interlaced and piled up. In the last stage (III), the fiber aggregates are added above thereto, thereby creating the functional filter media of three-layer structure.

During the forming procedure, the three stages are performed at the same time. The mixture of the short-cut fibers 1 and the functional particulates 2 is brought to onto the moving forming matrix 52 by means of the mixed airflow 41 which is then eliminated by the air suction device 51. The airflow in the whole process is controlled under a stable state so that it stably passes through the formed structure body. The main point of the aerodynamic forming process is the control in this stage. The initially formed filter media 8 whose sectional view is shown in FIG. 3 evidently with three-layer structure, comprising:

- a protection layer 81 situated at the bottom of the preformed filter media and mainly consisting of short-cut fibers 1, showing a denser accumulation state;
- an adsorptive layer 82 situated at the top of the protection layer 81 and mainly consisting of functional particulates 2 which is evenly interlaced with the short-cut fibers 1 to create a three-dimensional structure, wherein the piling-up density of the functional particulates 2 is lower while the density of space between the heat-treated short-cut fiber aggregates is greater so that tortuous flow paths are created between the short-cut fibers 1 and the functional particulates 2; and
- a flow equalizing layer 83 situated at the top of the adsorptive layer 82 and mainly consisting of short-cut fibers 1, showing a sparser piled state.

As above-mentioned, the laminated structure is created by means that the short-cut fibers 1 and the functional particulates 2 in the diffusing mixing conveying area 4 form three split-flow sections A1, A2, A3. When the mixed airflow 41 of the short-cut fibers 1 and the functional particulates 2 is piled up for forming, the fibers of the left section (I) will pile up on the moving forming matrix 52. Thereafter, the short-cut fibers 1 and the functional particulates 2 are interlaced and piled up in the middle section (II). Since the formed fiber aggregate at the bottom of the filter media can prevent the functional particulates 2 from being taken away by the airflow, the mixture of the short-cut fibers 1 and the functional particulates 2 can be evenly interlaced. Finally, it is brought to the right forming section (III), wherein the fibers are piled up to form on the top of the filter media. Accordingly, the aerodynamic interlacing process is ended.

In this stage, the present invention formed by the aerodynamic interlacing process can not only reach the simultaneously interlacing forming of the short-cut fibers 1 and the functional particulates 2, but also the filter media 8 has a three-dimensional structure of layers from sparse to dense. In the first forming stage (I), as shown in FIG. 3, the mixed airflow 41 leaves only the scattered short-cut fibers 1 in the left section (I) which is piled up on the moving forming matrix 52 first. Since the piled-up thickness is small, the airflow can rapidly pass through this section. Therefore, the piling-up density of the short-cut fibers 1 is higher, their structure is finer and the space between fibers is smaller. Moreover, the three-dimensional structure of the short-cut fiber aggregate will be even because of the stable airflow, thereby forming the protection layer 81 at the bottom of the filter media. With the short-cut fibers 1 and the functional particulates 2 interlaced and piled-up on the protection layer 81, the piling-up thickness is increased, the airflow speed in this structure is reduced and the short-cut fibers 1 are evenly interlaced with the functional particulates 2. Since the three-dimensional structure of both matters is much different, the density of the composite structure is lower than the density of the pure fiber structure, thereby creating the main adsorptive area, that is, the adsorptive layer 82 in the middle of the filter media 8. The interlacing of the short-cut fibers 1 and the functional particulates 2 through the aerodynamic forming method will enable them to fill properly and to create an even structural density. Besides, both of them are evenly scattered without the defective structure. At this time, the thickness of the whole filter media is increased degree by degree so that the airflow resistance is also raised. Finally, the mixed airflow 41 of the forming area III at the right side brings the short-cut fibers 1 at the split-flow section A3 to the adsorptive layer 82. Since the airflow at this forming area encounters the greatest resistance, the speed of the airflow passing through this structural body is lowest, thereby leading to the piled-up fibers with lower and more even density and creating the flow equalizing layer 83 in which the space between fibers is bigger and its evenness is higher.

Figure 4:
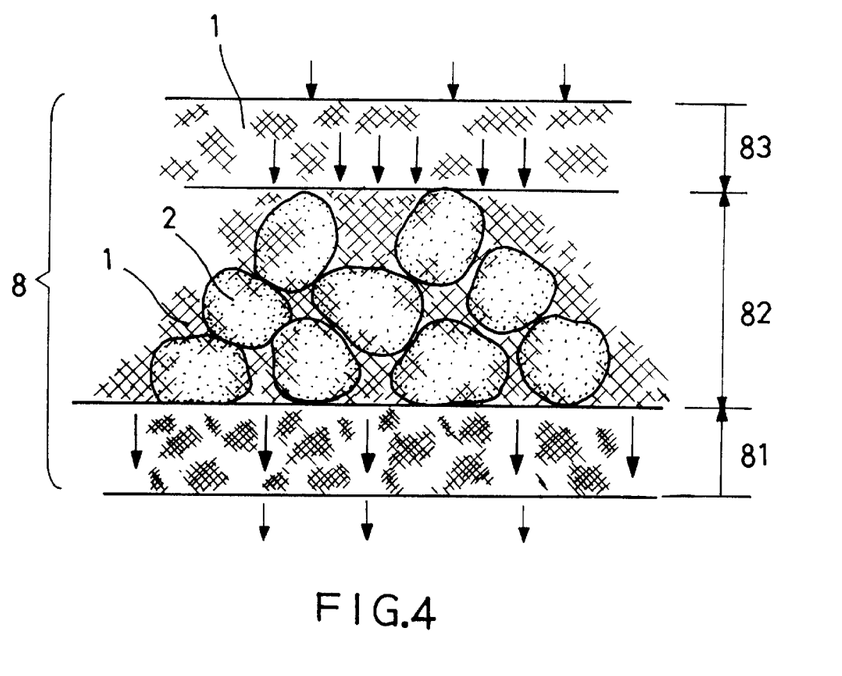
FIG. 4 is a schematic drawing of the sorbent of the filter media of the present invention before the heat treatment.

Take the activated carbon as the functional particulates for the filter media. When the filter media has the laminated structure from sparse to dense, the adsorptive efficiency will be much better than the filter media with single layer will. When the pollutant airflow passes through the filter media, it, as shown in FIG. 4, comes thereinto from the flow equalizing layer 83 and goes out from the protection layer 81. When the airflow pass through the fiber aggregate, it will be evenly scattered so that the area of that, the pollutant passes through the adsorptive layer 82, is increased and the pollutant airflow is evenly diffused into the fiber interlacing layer with activated carbon. When the thickness of the filter media for the pollutant airflow to pass is raised, the airflow speed will be lowered due to the diffusion and the resistance so that the residence time of the pollutant particles is prolonged. Meanwhile, more pollutant will be adsorbed by the functional particulates 2 (like activated carbon). The short-cut fiber aggregates in the protection layer 81 of the filter media 8 have a denser accumulation structure so that it has a greater resistance effect on the airflow. Accordingly, the residence time of the pollutant airflow in the adsorptive layer 82 is controllable. The area ratio of the split-flow sections A1, A2, A3 is adjustable by the composite air blower 3 of the present invention. Consequently, the accumulative thickness ratio of the laminated structure of the filter media in forming is controllable. The adjustment can be done in accordance with the required conditions of the pollutant to be filtered and adsorbed for best use efficiency and to meet the requirements of the customers. The higher the accumulation thickness is, the higher the airflow resistance, the longer the residence time and the better the adsorptive efficiency is, and vice-versa.

Moreover, the adsorptive layer 82 is situated between the flow equalizing layer 83 and the protection layer 81 so that the activated carbon granules 2 can be prevented from movement and peeling off. Besides, the short-cut fibers 1 and the activated carbon 2 in the adsorptive layer 82 are interlaced as three-dimensional structure which can also prevent the activated carbon granules 2 from displacement and peeling off. Therefore, the structural consistency and evenness of the whole filter media 8 is high after forming. In the filter media structure, the mixing ratio of the short-cut fibers and the activated carbon can be quantitatively controlled in the procedure. In the present invention, the content of the activated carbon can be controlled in the range of from 10% to 90% while the content of the short-cut fibers can also be controlled at the same range. A certain evenness of the structure and the distribution of both matters can be maintained. It's rare that the structure of relatively high and relatively low content is used for the normal adsorptive or filtering applications. As a result, the preferable content of the activated carbon is from 60% to 90% while the fiber content is from 15% to 40% for the best performance of the filter media 8. The base weight of the filter media can be controlled in the range of from 100 g/m$^2$ to 1,200 g/m$^2$ without overlapping the layers to reach heavy weight or high content. Therefore, the aerodynamic interlacing process can control the content of the ingredients, the change of the base weight of the filter media, etc. All of the conditions can be controlled at one time in the procedure without further processing. As a result, the development of this procedure is much valued.

In accordance with the change of the filter media base weight, different fiber denier size and activated carbon with different granule size can be interlaced in order to reach the above-mentioned even structure and the high consistency. And the present invention is unlike the other procedures in which additional activated carbon have to be added to the formed three-dimensional fiber matrix structure after completing the whole procedure. When the base weight of the filter media is too thin or too light and when the fiber diameter is large, the space between fibers must also be large. In order to fix the activated carbon in the space between fibers, the granules have to be large so that the unit amount of the activated carbon is large. In order to reduce the base weight under the same area of the filter media, the amount of the activated carbon granules has to be correspondingly reduced so that the distribution of the activated carbon is sparse and uneven and the adsorptive efficiency is considerably lowered. If the fiber diameter is reduced, the amount of fibers in unit area has to be increased for creating a three-dimensional mesh structure. Accordingly, the clearance between fibers becomes smaller so that the activated carbon can't enter into the space between fibers, the structural consistency is adversely affected and the activated carbon is much worn out. Consequently, the adsorptive efficiency of the filter media leaves much to be desired. To the contrary, the present invention utilizes the aerodynamic interlacing process to mix the short-cut fibers 1 with the activated carbon 2 through only one forming procedure without the above-mentioned problems. The reason is that both matters are interlaced at the same time. No matter how the fiber diameter or the activated carbon granule size changes, the high evenness and structural consistency of the adsorptive filter media can be reached only when they properly match.

Figure 6:
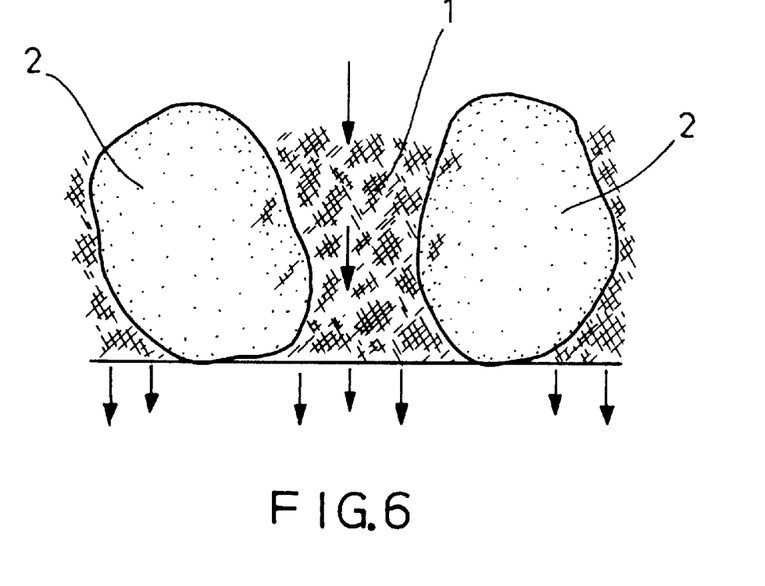
FIG. 6 is an enlarged view of FIG. 4.

After the filter media is formed, the main adsorptive function is completed by the adsorptive layer 82 formed by interlacing the short-cut fibers 1 and the activated carbon. Both matters are dispersed by the airstream. After mixing, they are piled up on the multilayer interlacing forming area 5. Since they are different in appearance and in three-dimensional structure, the transmitting flowability of the airstream is also different and the accumulative density is different as well. The activated carbon particles 2 are three-dimensional and irregular. When the airflow want to pass through the structure shown in FIG. 6, it has to go through the space between activated carbon granules. So, the granule space becomes the main channel of the airflow. At this time, the carried short-cut fibers 1 carried by the airflow fill the space between the activated carbon particles 2. The filling fibers 1 are blocked by the activated carbon particles 2 so that they are piled up to form a fiber aggregate mesh structure. Therefore, the resistance of the whole airflow is even and the speed of the passing airflow is uniform so that the adsorptive layer 82 of the filter media has a stable structure after it's formed. The three-dimensional structure with even density and well-distribution of the short-cut fibers 1 and the activated carbon 2, as shown in FIG. 4, can only be reached by the aerodynamic interlacing process.

After the short-cut fibers 1 and the activated carbon 2 are formed, only part of the airflow passes over the surface of the activated carbon because of the blocking effect of the three-dimensional activated carbon. Most of the airflow passes through the space between the fiber aggregate 1 formed by aerodynamic process since its density is even, the airflow resistance caused by the fiber aggregate 1 is uniform and even lower than the airflow resistance caused by the activated carbon particles 2. Hence, being filtered and adsorbed by this filter media, most of the pollutant particles pass through the space between the short-cut fibers 1. Beside, when the fiber aggregates 1 are so connected that the pollutant particles directly penetrate the filter media 8, the activated carbon 2 is not able to exert its effect.

The main point of the functionality of the activated carbon type adsorptive filter media lies in forming the non-linear tortuous airflow channels and increasing the contact surface with the activated carbon. With respect to this idea, no relevant disclosures are existing. The pre-condition of the aerodynamic interlacing process mainly lie in that the short-cut fibers 1 and the functional particulates 2 are evenly dispersed by the airflow and then interlaced together as three-dimensional structure. Both of them must be absolutely even. Thereafter, the pre-formed filter media 8 is heat-treated (see FIG. 2). The pre-formed filter media 8 is brought to the heat treatment area 6 by means of the moving forming matrix 52. At this time, the filter media 8 is covered with a layer of a positioning forming matrix 54 at the top thereof. Depending on the production speed and the filter media base weight, the heat-treated temperature is maintained in the range of from 120° C. to 180° C. Unlike that the heat treatment is performed by the simple radiation or the circular hot wind, the present invention utilizes the far infrared ray as heat source 61 while the air suction device 62 is arranged under the filter media 8 in order for the hot airflow to penetrate so that the filter media 8 can be evenly heated. Since the suction air is arranged under the filter media 8, the more the layer of the filter media 8 approaches to the suction air, the greater the suction force is, and vice-versa. Therefore, the structure of the filter media 8 is made with the sparser layer at the top and the denser layer at the bottom thereof. This kind of structure plays a significant role in the adsorptive function. When the heat-treated filter media 8 exits the heat treatment area, it enters into the cooling area. In cooling the filter media 8, another air suction device 71 is also arranged beneath to produce suction air in order to ensure the structural consistency during the forming, heat and cold treatment processes, that is, the structure should be sparse at the top and dense at the bottom.

After the short-cut fibers 1 is heat-treated and reaches its melting point, the surface of the fiber begins to be fused and to produce thermal contraction. When the surface is melted, the short-cut fibers 1 and the activated carbon particles 2 are bonded together while the short-cut fibers 1 are also bonded with one another and contracted. After the heat treatment, the bonding between the fibers of the filter media 8 leads to the increase of the structural strength and consistency while the softness of the fibers is maintained. Hence, the flexibility of the filter media can relatively improve the shaping effect. To the contrary, the activated carbon particles 2 won't be melted and contracted by the heat treatment. The heat serves an important energy for bonding the activated carbon particles 2 because the activated carbon can be dehumidified and re-activated through heat in order to maximize the best adsorptive performance. This kind of bonding way doesn't require any adhesive to strengthen the structure. In addition, the surface of the activated carbon particles 2 won't be covered by the adhesive so that the adsorptive surface is large to enhance the adsorptive ability.

Figure 5:
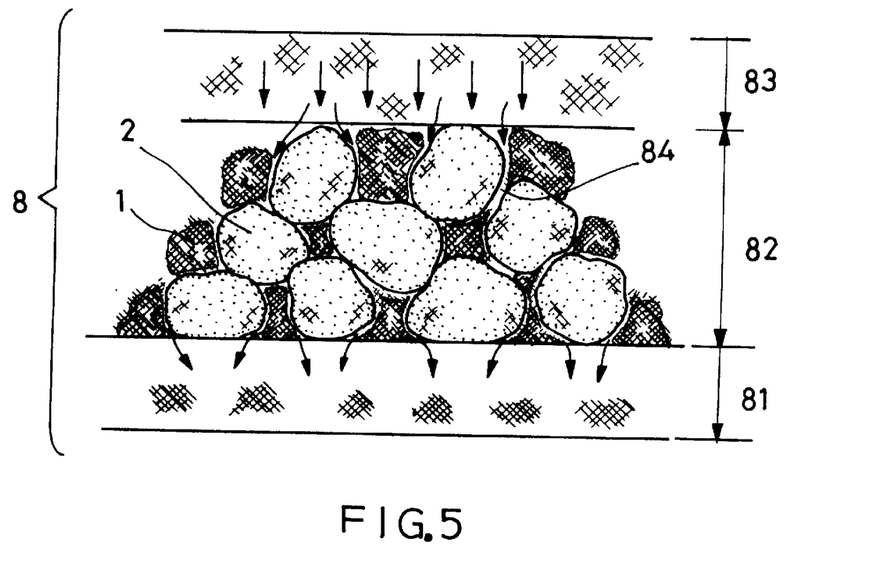
FIG. 5 is a schematic drawing of the sorbent of the filter media of the present invention after the heat treatment.
Figure 7:
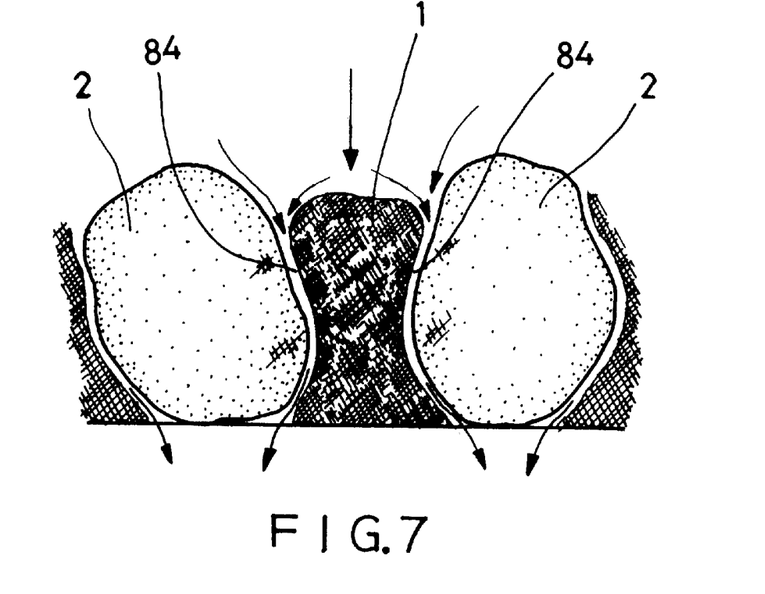
FIG. 7 is an enlarged view of FIG. 5.

Heat enables the fibers to contract. So, the fiber aggregate filled in the space between activated carbon particles 2 contracts, as shown in FIGS. 5 and 7, thereby reducing the space between fibers and leading to a denser structure of the whole fiber aggregate so that the formed structure provides a greater resistance to the airflow. The space between the short-cut fibers 1 and the activated carbon particles 2 is enlarged since the activated carbon particles 2 don't contract while the fibers contract. And the three-dimensional blocking effect of the activated carbon particles 2 doesn't lead to a great displacement and the space size between them is maintained. Thus, the space between the short-cut fibers 1 and the activated carbon particles 2 is increased, and the structure at this position is loosened. The above-mentioned is illustrated in FIG. 7. When the chemical contamination airflow passes through the activated carbon type adsorptive filter media, the space between the activated carbon particles 2 and the contracted fiber aggregate 1 serves as flow paths due to the resistance created by the activated carbon particles 2 and the contracted fiber aggregate 1. Hence, the contact possibility of the pollutant particles in the chemical pollutant airflow with the activated carbon particles 2 is increased, thereby enhancing the adsorptive efficiency. Consequently, the present invention is superior to the other activated carbon filter media. As the filter media has the three-dimensional structure, the flow paths produced are non-linear and tortuous, thereby prolong the residence time and the duration that the activated carbon particles 2 adsorb the pollutant particles and enhancing the whole function of the filter media 8.

Accordingly, the present invention that utilizes the aerodynamic process to interlace the short-cut fibers and the functional particulates for forming a three-dimensional structure of the activated carbon type filter media can achieve an even and stable structure of the adsorptive filter media. Moreover, the filter media is controlled by the heat treatment procedure to create the significant structural feature for enhancing the adsorptive efficiency. Additionally, the composite and flexible features of the present invention is much superior to other adsorptive filter media.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method of utilizing the aerodynamic interlacing process to produce a chemical filter media, comprising the steps of:
    (a) utilizing airflow to bring short-cut fibers and functional particulates to a composite air blower while the blowing airflow of said functional particulates enters into said composite air blower from the center thereof, and said composite air blower is constructed as a conventional blowing apparatus with a substantially rectangular cross-sectional shape to form a narrow and slim blowing mouth, thereby enabling the blowing air of said short-cut fibers and said functional particulates to enter into a diffusing mixing conveying area at the same time so that the mixed airflow diffuses said short-cut fibers and said functional particulates from the top to the bottom which flow afterwards through an air deflector or guide device so that the airflow is able to smoothly bring them to a multilayer interlacing forming area beneath,
    (b) utilizing an air suction device under said multilayer interlacing forming area to adsorb said short-cut fibers and said functional particulates for sequentially piling up on a moving forming matrix while the suction air volume of the air suction device is adjusted as desired in order to create a balance between said suction air volume and said mixed blowing air so that said filter media is formed with a laminated structure having three layers, consisting of a protection layer situated at the bottom of the pre-formed filter media, a flow equalizing layer situated at the top of said pre-formed filter media, and an adsorptive layer situated between said protection layer and said flow equalizing layer, wherein the adsorptive layer contains a greater density of functional particulates than the density of functional particulates contained in the protection layer or the flow equalizing layer;
    (c) bringing said pre-formed filter media to a heat treatment area over which a heat source is provided for heating said filter media while the heating temperature is controlled in the range of from 120° C. to 180° C.; and
    (d) bringing said heat-treated filter media to a quenching or cooling area, wherein a further air suction device under said filter media continues to operate.

2. The method as recited in claim 1, wherein said functional particulate matter is a material chosen from the group that consists of activated carbon, potassium permanganate impregnated aluminum oxide and chemical adsorptive macromolecule.

3. The method as recited in claim 1, wherein said diffusing mixing conveying area is constructed as a mixing chute with the opening downwards while said air deflector device disposed therein consists of a number of air deflector plates.

4. The method as recited in claim 1, wherein said heat treatment area has an air suction device which is arranged under said filter media and continues to operate.

* * * * *